MULTICOLOR REPRODUCTION USING LIGHT SENSITIVE DIAZO OXIDES

Filed June 17, 1958

INVENTORS
DOUGLAS STRAW
CLIFFORD E. HERRICK, JR.

BY Henry W. [signature]
E. C. [signature]
ATTORNEYS

United States Patent Office 2,993,788
Patented July 25, 1961

2,993,788

MULTICOLOR REPRODUCTION USING LIGHT SENSITIVE DIAZO OXIDES

Douglas Straw, Binghamton, and Clifford E. Herrick, Jr., Chenango Forks, N.Y., assignors to General Aniline & Film Corporation, New York, N.Y., a corporation of Delaware Filed June 17, 1958, Ser. No. 742,650
2 Claims. (Cl. 96—13)

Figure 1:
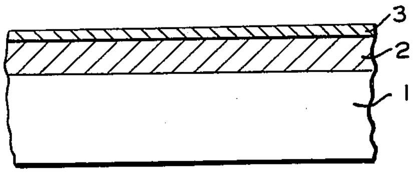

This invention relates to a photomechanical color reproduction process and more particularly to a color process for the production and superimposition of dye images.

It has been proposed to apply the diazotype process for the production of colored reproductions and considerable effort has been expended in this direction. The diazotype process offers many advantages, chief among which is the very wide range of materials which can be sensitized and caused to serve as an image-bearing surface or support. Thus, textiles, metal sheets, papers, and plastic foils are among the numerous materials which can serve as bases for diazotype images.

An important application for diazotype foil material is in connection with color printing. Thus, diazotype materials find extensive application in the pre-testing or proofing of half-tone color separation originals from which are made color printing plates, e.g., as in offset, letter press or gravure printing. As is well-known, half-tone color separation originals normally require a certain amount of local correction or alteration if they are to faithfully reproduce in terms of press inks, the colors of the original scene. The diazotype foils have been found to be very valuable guides in such correction work since these foils can be manufactured in colors capable of approximating the inks commonly used in the printing trades. Correspondence in lightness, strength, or stain with the printing inks can also be matched by the above diazotype foils by uniformly reducing the density of the entire foil by a brief pre-flashing exposure to achieve different levels of color density.

In order to produce the desired proof, each of the (possibly corrected) separation positives is printed onto a diazotype foil of the appropriate color and the so obtained foils then overlaid in register on a white background.

Although this proofing process has proved useful and is widely used, it suffers from certain limitations. Since the color of the foils is determined by the type of coating provided by the manufacturer, and since the process inks are available in a greater variety of color, it is manifestly impossible to achieve an exact match between the diazotype colors and the inks used by the manufacturer. Another limitation is a degradation in color due to the overlay itself. Thus, prints made on diazotype foils often show discolored backgrounds caused either by precoupling of the dye-forming components prior to processing and/or discoloration due to photodecomposition products or stabilizing chemicals after processing. Such discolorations are particularly apparent when two or more foils are superimposed to yield a multicolor reproduction.

Finally, the above diazotype color reproduction system is positive working, that is, it can only be used with positive originals which might have to be especially produced for diazotype processing. Although negative-working, color-proofing processes have appeared on the market, they lack the flexibility, speed, and convenience characteristic of the diazotype materials.

One such negative-working, color-proofing process comprises a white plastic material coated with a mixture of ink pigments in a binder of dichromated casein. After thorough drying, the coating is exposed beneath a half-tone separation and subsequently developed in dilute ammonia solution. This procedure is then repeated for each color. Although in theory, a good color match between the proof and press copy should be obtained since the same pigments can be used in both reproductions, this is frequently not the case. In practice, the photoproducts obtained during the exposure in the proof making are colored and may contaminate to a degree, the hue of each perfect color. Further, since the process involves a tanning or light hardening process, the density of any single color on the proof depends upon the thickness of the sensitizing layer and, for all practical purposes, is difficult to control to the desired degree.

Another method of proofing color negatives involves treating the photographic silver negative itself. In this process, the silver-bearing gelatin of each negative is removed in a bleach composed of a copper salt such as copper bromide and hydrogen peroxide, whereupon the resulting clear gelatin positive is dyed with a gelatin staining dye. Although this process has the advantage that many dyes are available so that a reasonable color match can be obtained, it nevertheless, suffers from the fact that each color is reproduced on a separate foil, a condition which requires that the individual color proofs be laid over one another to obtain the final multicolor proofs. This process evidently involves the production by expensive photographic means of an additional set of separation negatives and has not found extensive use in practice.

It is, therefore, believed to be evident that a need exists for a suitable negative-working color process for the production and superimposition of colored images free of the drawbacks and encumbrances of those of the prior art.

It has now been discovered that colored separation images can be produced by the use of negative-working materials wherein all of said colored images appear in a single layer.

Color reproductions produced in this fashion and a process for providing said separation images and their superimposition constitute the objects and purposes of the present invention.

According to the present invention, we utilize a material comprising a base material carrying on at least one side thereof, a layer comprising a mixture of a maleic anhydride co-polymer formed from about 1 mol of an alkylvinyl ether and about 1 mol of maleic anhydride in association with a hydrophobic resin or mixture of resins compatible with said co-polymer. Said maleic anhydride-alkylvinyl co-polymers are described in U.S. Patent 2,744,098; Serial No. 669,942; filed July 5, 1957. The aforesaid layer, referred to hereinafter as the carrier layer, is hydrophobic as coated and hence unreceptive to water or water-miscible substances. However, hydrophilic character may be imparted to the carrier layer by treating the surface thereby with an alkaline material such as a moist water-soluble nitrogenous base. The carrier layer is then sensitized by coating it with an organic solvent solution containing, as the light-sensitive element, sensitizers or combination of sensitizers of the type described in the Herrick et al. U.S. Patent 2,772,972 and known as diazo oxides.

In the accompanying drawings (FIGS. 1–9) are shown in enlarged section and in diagrammatic form the manner of construction of the light-sensitive layers and how such layers may be employed to produce colored images which are superimposed to form a colored reproduction.

Our invention will now be described with particular reference to the accompanying drawings in which like reference characters refer to corresponding parts.

FIG. 1 represents the sensitized assembly before exposure in which 1 is the support; 2 is a polymeric carrier layer comprising a co-polymer of maleic anhydride and an alkylvinyl ether in association with a hydrophobic resin and 3 is the hydrophobic light-sensitive layer containing a light-sensitive diazo oxide.

Figure 2:
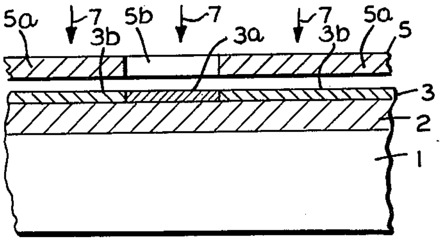

FIG. 2 shows the assembly of FIG. 1 during the exposure step in which 7 represents a light source and 5 is a color separation negative corresponding to one of the primary color aspects of a subject; *5a* represents the areas opaque and *5b* the areas transparent to light of the color separation negative; *3a* represents the light struck portions and *3b* the non-light struck portions of the light-sensitive diazo layer 3.

Figure 3:
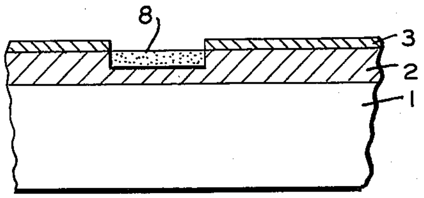

In FIG. 3 is shown the step following exposure. The diazo material is swabbed with an alkaline developing solution which removes the photodecomposed products in the light struck areas, thus exposing the polymeric carrier layer 2 to the alkaline developing solution which forms a hydrophilic region 8 in the said carrier layer 2 corresponding to the light struck areas in the diazo layer 3.

Figure 4:
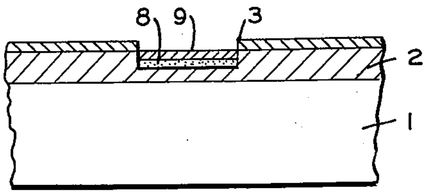

The hydrophilic region 8 of the carrier layer 2 which corresponds to one of the primary color aspects of a subject is now subtractively colored by means of a water-soluble basic dye as shown in 9 of FIG. 4.

Figure 5:
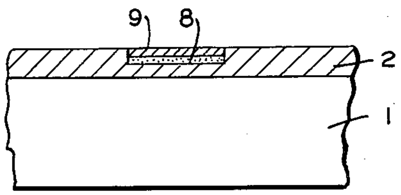

The residual unexposed diazo layer 3 is removed with a suitable organic solvent which leaves the subtractively colored image 9 in the carrier layer as shown in FIG. 5.

Figure 6:
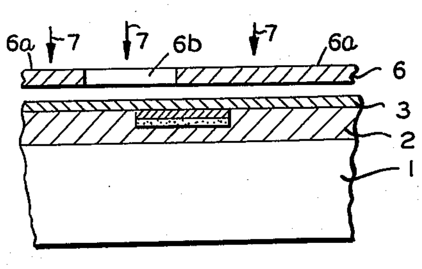
Figure 7:
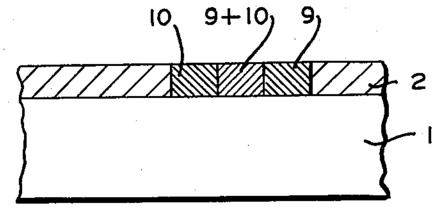
Figure 8:
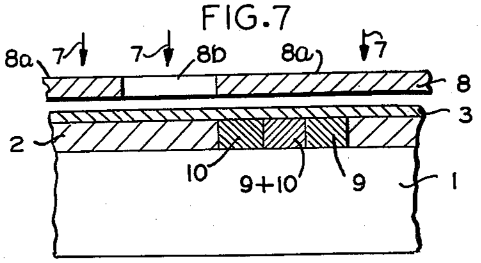

The carrier layer is then resensitized with a diazo oxide sensitizer and adhesive resin, as above, and exposed, as in FIG. 6, to a second color separation negative corresponding to a second primary color aspect of the subject, as shown in FIG. 7, wherein 10 is the second subtractively colored image.

Figure 9:
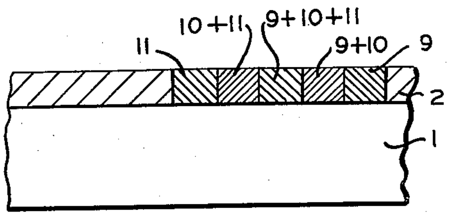

The carrier layer is again resensitized with the same diazo oxide resin combination and exposed under a third color separation negative. By processing, as above, the third primary color aspect of the subject 11 is formed, thus giving use to a complete color reproduction as shown in FIG. 9. Since the primary color aspects of the subject are firmly fixed in an integral construction rather than physically separate super-impositions, a color reproduction is obtained having an extremely low degree of distortion.

Additional colors can evidently be added as described heretofore so that 4, 5, 6, or more colors can be employed.

The ability to match colors of the dyed print with that of the corresponding printing ink in a final printed press copy by appropriate selection of the dye(s), coupled with the ability to control the color density by concentration of the dye in the dye bath and/or dyeing time, results in a unique process capable of yielding color proofs of hitherto unparalleled fidelity.

According to the present invention, we prepare diazotype materials of the type shown in FIG. 1 by lacquering a suitable substrate, for instance, cellulose triacetate, with a mixture comprising a resinous co-polymer of about 1 mol of a suitable alkyl vinyl ether, and about 1 mol of moleic anhydride and a hydrophobic resin compatible with said co-polymer. As lacquered, these materials are hydrophobic and are non-receptive to water or water-miscible substances. However, hydrophilic character can be imparted by treating the coated surface containing the aforesaid resinous co-polymer with an alkali such as a moist water-soluble nitrogenous base, and the like.

The aforesaid carrier layer is sensitized by coating it with a solvent solution containing a light-sensitive, water-insoluble diazo oxide. The adhesion of the sensitized layer may be controlled by the addition of compatible resins such as vinyl acetate, cellulose triacetate, and the like, as well as by the addition of small amounts of active solvents for the carrier layer, e.g., ethyl acetate, methyl Cellosolve acetate, and the like, to an essentially non-penetrating solvent such as methylisobutyl ketone. When such sensitized materials are exposed beneath a negative to a source rich in ultraviolet light, the diazo oxide sensitizers are decomposed in irradiated areas. The photodecomposed products are then removed with an alkaline developing agent which lays bare the carrier layer below which is then rendered hydrophilic by the action of the alkaline developer. Resulting hydrophilic images are then colored as previously described in connection with the drawings.

Sensitizers which we have found to be suitable include the water-insoluble, light-sensitive diazo oxides such as sulfo amides and sulfuric acid esters of diazonaphthol-5-sulfonic acid of the type described in the Herrick et al. U.S. Patent 2,772,972 and typified in the following list:

2-diazo-1-naphthol-5-sulfuric acid ethyl ester
2-diazo-1-naphthol-5-sulfuric acid phenyl ester
2-diazo-1-naphthol-5-sulfuric acid butyl ester
1-diazo-2-naphthol-5-sulfuric acid ethyl ester
2-diazo-1-naphthol-5-sulfonamide
2-diazo-1-naphthol-5-N-butylsulfonamide
2-diazo-1-naphthol-5-N,N'-dimethylsulfonamide Other diazo oxides of the above type can be found in the appended examples:

*Example I*

A pre-formed film of cellulose triacetate was coated by the reverse roll method with the following solution:

4.5 parts by weight of PVM/MA (polyvinyl methyl ether-maleic anhydride co-polymer)
5.5 parts by weight of cellulose triacetate, low viscosity grade
140 parts by volume of acetone
40 parts by volume of ethyl acetate
20 parts by volume of methyl Cellosolve acetate After drying, a sheet of this material was coated on the prepared side with a solution containing:

100 parts of methylisobutyl ketone
2 parts of polyvinyl acetate, low viscosity grade
2 parts of the diazo compound having the structure:

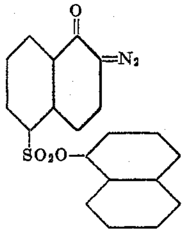

The thoroughly dried sheet was exposed beneath the blue, negative half-tone color separation of a set of color separations to the radiations of a carbon arc for 90 seconds. The photoproducts were removed imagewise from the sheet by swabbing with a solution of 60 parts of ethylene glycol, 20 parts of diethanolamine and 20 parts of glycerine and the developed sheet immersed in a tray containing a solution comprising:

800 ml. water
200 ml. ethylene glycol
2 g. methylene blue
2 ml. diethanolamine for 20 seconds. Excessive dye solution was removed beneath a stream of water and the sheet wiped dry. Residual sensitizing layer was removed by swabbing with methylisobutyl ketone and the sheet dried. This resulted in the blue segment of the color picture on the clear foil.

The prepared side was resensitized with the solution given above and processed as with the blue separation negative except that it was exposed beneath the yellow separation and dyed in a solution comprising:

800 ml. water
200 ml. ethylene glycol
2.5 g. Auramine O
2 ml. diethanolamine

After a third sensitization, the sheet was exposed beneath the red separation negative, processed and dyed in a solution containing:

800 ml. water
200 ml. ethylene glycol
4.0 g. Magenta ABN
2 ml. diethanolamine

After a rinse and removal of the residual sensitizing layer, the result was an extremely clear, bright and pleasing color proof.

*Example II*

The procedure is the same as that employed in Example I except that Genacryl Blue 6G, Euchrysine GGA and Genacryl Red 6B were substituted respectively for the Methylene Blue Auramine O and Magenta ABN used in Example I. The resulting color proof showed extremely bright and clear colors.

*Example III*

A sheet of lacquered film was prepared as in Example I. After drying, this carrier layer was sensitized with a solution comprising:

75 ml. methylisobutyl ketone
15 ml. acetone
10 methyl Cellosolve acetate
0.7 g. polyvinyl acetate
0.4 g. Vinylite BMCH sold by the Bakelite Co.
2.0 g. N-dehydroabietyl-6-diazo-5-(6)-oxo-1-naphthalene sulfonamide The thoroughly dried sheet was exposed beneath the blue, negative half-tone color separation of a set of color separations to the radiations of a carbon arc for 60 seconds. The photoproducts were removed imagewise by swabbing with a solution containing:

65 ml. ethylene glycol
25 ml. glycerine
2 ml. monoethanolamine
8 ml. diethanolamine and the developed sheet immersed in a tray containing:

750 ml. water
250 ml. ethylene glycol
2 ml. diethanolamine
2.5 g. Genacryl Blue 5B for about 25 seconds. Excessive dye solution was rinsed off with water and the sheet wiped dry. Residual sensitizing layer was removed by swabbing with toluene and the sheet subsequently dried. This sheet was then resensitized with the above sensitizing solution, exposed, developed, dyed, etc. (completely processed) three more times as above, except that the exposures were carried out beneath the yellow, red and black negative half-tone color separations respectively.

The corresponding dye baths for the yellow, red and black printers were as follows:

Yellow:
750 ml. water
250 ml. ethylene glycol
2 ml. diethanolamine
3.0 g. Genacryl Yellow 3G Red:
750 ml. water
250 ml. ethylene glycol
1 ml. monoethanolamine
3.0 g. S franine Y Black:
800 ml. water
200 ml. ethylene glycol
1 ml. diethanolamine
3.0 g. Thioflavine TCND
0.4 g. Magenta ABN
0.5 g. Brilliant Green Crystals
1.5 g. Methylene Blue The resulting color proof which resulted was made up of four colors (blue, yellow, red, black) and was an excellent color reproduction.

Typical maleic anhydride-polyvinyl alkyl ether co-polymers suitable for preparing the resinous carrier layers described herein include:

Polyvinyl methyl ether-maleic anhydride (hereinafter sometimes referred to as PVM/MA)
Polyvinyl ethyl ether-maleic anhydride
Polyvinyl-2-chloro ethyl ether-maleic anhydride
Polylvinyl butyl ether-maleic anhydride
Polyvinyl isobutyl-maleic anhydride
Polyvinyl methoxy ethyl ether-maleic anhydride The polyvinyl ether-maleic anhydride (PVM/MA) used has a viscosity of 1.0–1.5 in 2-butanone at 20° C., and is manufactured and sold by General Aniline and Film Corporation. The other maleic anhydride-polyvinyl ether co-polymers were prepared according to the previously mentioned U.S. Patent 2,744,098.

The basic dyes given for illustration in the above examples are by no means all exhaustive of those contemplated for use in our invention.

Other suitable basic dyes are described in the Color Index, vol. I, second edition, 1956, and include: Color Index Basic Yellow 1, 2, 4, 10, 11; Color Index Basic Orange 14, 22; Color Index Basic Red 1, 2, 5, 9, 13; Color Index Basic Violet 1, 3, 4, 5, 7, 10, 14; Color Index Basic Blue 1, 5, 6, 9, 12; Color Index Basic Green 1, 4.

We claim:

1. A method of preparing a colored reproduction by the superimposition of dye images corresponding to at least two of the primary color aspects of a subject which comprises exposing by light to a color separation negative, a light-sensitive material comprising a base, a lacquer layer on said base comprising a homogeneous mixture of a co-polymer of a vinyl alkyl ether and maleic anhydride and a hydrophobic resin compatible therewith and an overcoating on said lacquer layer of a water-insoluble adhesive resin and a light-sensitive, water-insoluble diazo oxide, developing through locally removing, by means of a developer comprising a liquid aliphatic polyhydroxy compound, the overcoating where exposed to light and imparting hydrophilic character to the lacquer layer in the exposed areas by treatment with an alkylolamine soluble in the aforesaid aliphatic polyhydroxy compound, dyeing the exposed areas with a color material substantive to the hydrophilic areas of said lacquer layer, removing the residual overcoating from the lacquer layer, resensitizing the lacquer layer by re-application of the overcoating over the entire area of the lacquer layer, exposing the resensitized layer to a different color separation negative of the same subject, repeating the steps of developing and imparting hydrophilic character to the lacquer layer in the exposed areas and dyeing the exposed areas with a different colorant substantive to the hydrophilic areas of said lacquer layer, removing the residual overcoating, and repeating the process outlined according to the number of separation negatives required to produce the final result.

2. The method of preparing a colored reproduction which comprises exposing by light to a color separation negative, a light-sensitive material comprising a base, a lacquer layer on said base comprising a homogeneous mixture of a co-polymer of a vinyl alkyl ether and maleic anhydride and a hydrophobic resin compatible therewith and an overcoating on said lacquer layer of a water-insoluble adhesive resin and a light-sensitive, water-insoluble diazo oxide, developing through locally removing, by means of a developer comprising a liquid aliphatic polyhydroxy compound, the overcoating where exposed to light and imparting hydrophilic character to the lacquer layer in the exposed areas by treatment with an alkylolamine soluble in the aforesaid aliphatic polyhydroxy compound, dyeing the exposed areas with a color material substantive to the hydrophilic areas of said lacquer layer, and removing the residual overcoating from the lacquer layer.

References Cited in the file of this patent

UNITED STATES PATENTS

| | | |
|---|---|---|
| 1,918,623 | Wendt | July 18, 1933 |
| 2,759,818 | Mahler | Aug. 21, 1956 |
| 2,772,972 | Herrick et al. | Dec. 4, 1956 |